United States Patent [19]

Yamamoto et al.

[11] Patent Number: 5,028,444
[45] Date of Patent: Jul. 2, 1991

[54] FROZEN SURIMI PRODUCT AND PROCESS FOR PREPARING

[75] Inventors: Yasuhiro Yamamoto, Shizuoka; Takeshi Okubo, Tokyo; Shizuo Hatayama, Kanagawa; Mayuko Naito; Takashi Ebisu, both of Shizuoka, all of Japan

[73] Assignee: Towa Chemical Industry Co., Ltd., Tokyo, Japan

[21] Appl. No.: 445,839

[22] PCT Filed: Mar. 28, 1989

[86] PCT No.: PCT/JP89/00322

§ 371 Date: Nov. 22, 1989

§ 102(e) Date: Nov. 22, 1989

[87] PCT Pub. No.: WO89/08992

PCT Pub. Date: Oct. 5, 1989

[30] Foreign Application Priority Data

Mar. 29, 1988 [JP] Japan .................................. 63-73154

[51] Int. Cl.$^5$ .............................................. A23L 1/325
[52] U.S. Cl. ...................... 426/332; 426/643; 426/652
[58] Field of Search ............... 426/643, 652, 654, 332, 426/583

[56] References Cited

U.S. PATENT DOCUMENTS

| | | | |
|---|---|---|---|
| 4,168,323 | 9/1979 | Inamine et al. | 426/643 X |
| 4,206,244 | 6/1980 | Schenk | 426/654 X |
| 4,289,788 | 9/1981 | Cajigas | 426/583 X |
| 4,347,258 | 8/1982 | Merkenich et al. | 426/583 X |
| 4,388,337 | 6/1983 | Cawdron | 426/583 X |
| 4,784,871 | 11/1988 | Park | 426/583 |

FOREIGN PATENT DOCUMENTS

| | | | |
|---|---|---|---|
| 83262 | 5/1982 | Japan | 426/643 |
| 130667 | 6/1987 | Japan | 426/643 |

OTHER PUBLICATIONS

TsNIITEIRKh Review; The Series: Processing of Fish and Sea Products: 3rd Issue, Moscow, 1984, p. 3. "Ways of Improving-Products".

*Primary Examiner*—Arthur L. Corbin
*Attorney, Agent, or Firm*—Beveridge, DeGrandi & Weilacher

[57] ABSTRACT

The present invention relates to quality-improving agents for Frozen SURIMI which is used as a raw material of fish pastes, and also relates to a process for preparing Frozen SURIMI which comprises using such quality-improving agents. The quality-improving agents for addition to Frozen SURIMI comprise, as an effective ingredient, a mixture of sodium bicarbonate, calcium citrate and calcium lactate.

14 Claims, No Drawings

5,028,444

FROZEN SURIMI PRODUCT AND PROCESS FOR PREPARING

TECHNICAL FIELD

This invention relates to quality-improving agents for Frozen SURIMI (ground frozen fish) useful as a raw material for fish pastes such as KAMABOKO (fish jelly) and a process for preparing Frozen SURIMI using the same.

BACKGROUND ART

Items considered to be extremely important among items for quality evaluation of fish pastes such as KAMABOKO are whiteness and elasticity.

In preparation of fish pastes excellent in such whiteness and elasticity, it is the quality of Frozen SURIMI that has the most influence on these quality evaluating items, and it is freshness of the fish that has the most influence on the quality.

Almost all fish pastes are now prepared from Frozen SURIMI, and almost all the Frozen SURIMI are prepared from walleye pollacks (gadiformes theragra) as a raw material. Specialization progresses in the industry and manufacturers of Frozen SURIMI and manufacturers preparing fish pastes using it are now present. Most of products which are in circulation between both manufacturers are Frozen SURIMI.

As for the walleye pollacks, it has gradually become difficult to get securely fish meal having a high freshness and a good quality due to recent fishing spots having become distant, delay of time from harvest to processing following decrease of fishery amount in one's country and purchase from abroad, and further decrease of fish source, etc.

That is, preparation of Frozen SURIMI having a good quality has become difficult due to the fact that every time fish meat is obtained scattering of its freshness has become larger and that fishery amount has been decreased.

Further, fishery term of walleye pollacks are limited to relatively short term and on the other hand, preparation of fish pastes is carried out throughout the year. Thus, Frozen SURIMI is preserved in a frozen state, when preserved for a long term, over a long term of nearly one year, and denaturing of fish meat proteins in the frozen state could occur in the preservation.

It is lowering of whiteness and elasticity of fish pastes that has been brought about from these background, and in order to solve these problems, several methods have been proposed, and as for improvement of whiteness many potential inventions have been introduced.

Many of these methods have been introduced as those of improving the whiteness as well as preventing lowering of the elasticity or increasing the elasticity.

It is, for example, a method of using surfactant(s) such as glycerine monofatty acid ester together with sugar(s) and/or sugar alcohol(s) for filtrated meat obtained by a conventional method that has been proposed as a method for improving the whiteness and elasticity.

On the other hand, many methods for improving only the elasticity have been proposed, and examples thereof include a method of adding 0.5 to 5 weight parts of plasma protein or the white of eggs per 100 parts of the meat, and the like.

However, in any of the introduced methods for improving lowering of the elasticity together with enhancing the whiteness, the effect is weak. By the reason and other reasons, although there are methods which satisfactorily improve the whiteness, there are scarcely methods which satisfactorily improve the elasticity.

Further, even the methods which have been introduced as those of improving only the elasticity have not been satisfactory ones because when the improvers used therein are added in an amount enough to exhibit a satisfactory improvement effect, there arises a fatal problem in taste, aroma, etc.

For example, plasma proteins have an animal odor and an bloody odor peculiar to blood, and terribly impair the flavor of KAMABOKO, and the white, which exhibits its elasticity increasing effect for the first time when used in much amount, has a strong trend to harden the products and a disadvantage to leave a smell peculiar to the white.

It is generally jelly strength that is used as an index of the elasticity, and jelly strength is calculated as the product of W-value (namely, fracture strength or hardness) and L-value (namely, dent or flexibility). Methods which have hitherto been introduced scarcely increase both values or increase W-value alone.

That is, although there have been methods to increase hardness of fish pastes, there has been no method to increase flexibility, i.e. L-value, and improvement in this point has strongly been desired.

SUMMARY OF THE INVENTION

The present inventors have vigorously studied for enhancing elasticity of fish pastes, and as a result succeeded in enhancing elasticity of fish pastes by adding sodium bicarbonate, calcium citrate and calcium lactate at the preparation of SURIMI followed by mixing and have completed the present invention.

The content of the present invention is detailedly described below.

The present invention relates to a quality-improving agent for addition to Frozen SURIMI which comprises as an effective component a mixture of sodium bicarbonate, calcium citrate and calcium lactate.

Further, the improving agent of the present invention is used in an amount ranging, preferably 0.01 to 3 weight (wt) %, more preferably 0.05 to 0.5 wt %, based on fish meat SURIMI.

As sodium bicarbonate which can be used in the invention those being commercially available and having a quality for addition to foods will do, and this is also the case with quality of calcium lactate and calcium citrate.

Calcium lactate can exist in a state of from anhydride to pentahydrate and calcium citrate can exist in a state of from anhydride to tetrahydrate or an acidic salt, and any of them can be used in the invention.

Composition of the improving agents of the present invention has an extremely large influence on the quality of fish pastes, and it is necessary to use a composition ratio of 0.1 to 10 weight parts of calcium citrate per 1 weight part of calcium lactate.

Further, in order to improve elasticity of fish pastes prepared from Frozen SURIMI, the product of the present invention is desirably used in an amount such that 0.01 to 3 weight parts of a mixture of sodium bicarbonate, calcium citrate and calcium lactate is employed per 100 weight parts of filtrated meat, and if necessary, 3 to 20 weight parts of one member or a mixture of two or more members selected from sugars and/or sugar alcohols and/or 0.1 to 1 weight part of a polymerized phosphate (i.e., mixture of sodium pyrophosphate and sodium tripolyphosphate) and/or a whiteness-enhancing agent and/or the like may also be added.

As the improving agents of the present invention a mixture of sodium bicarbonate, calcium citrate and calcium lactate can be used as such. However, preparation of Frozen SURIMI is usually carried out by grinding down walleye pollacks in a room whose temperature is adjusted to 5° C. or less while various additives are added thereto and mixed therewith, and the mixing time is relatively short. Thus, when the above mixture is used as such, it is often not dispersed in the fish meat and mixed therewith uniformly because of its small amount.

Therefore, it is usually desirable to use the above mixture in the form of powder, granule, liquid or the like formulated by adding thereto diluents, other additives, etc.

Among various formulation forms, it is particularly preferable to use the improving agents of the present invention as a powdery or granular agent having particle size of 16 to 175 mesh obtained by adding 0.3 to 180 weight parts of the above mixture to 100 parts of sugar and/or sugar alcohol, and preferably, the effective ingredients are added in the rate of 0.1 to 60 weight parts, respectively.

Usable sugars and/or sugar alcohols include sucrose, glucose, maltose, fructose, lactose, sorbitol, mannitol, xylitol, maltitol, lactitol and the like and mixtures thereof.

When a liquid agent is prepared, the effective ingredients could be dispersed or suspended in glycerine, etc. However, as quality-improving agents for addition to Frozen SURIMI are often preserved and/or used at a very low temperature, liquid agents may sometimes cause problems such as freezing, and further, labor and/or cost become necessary for treatment of packing and vessels after use of liquid agents. Thus, liquid agents are not considered as a preferred form.

Further, when a polymerized phosphate is mixed with the improving agent of the invention, steps of weighing, adding and mixing of the phosphate in preparation of SURIMI can be omitted. Further, when the improving agent of the invention is used together, for example, with agents having effects enhancing elasticity or whiteness such as surfactant or fat and oil, or when such agents are used in the form formulated by mixing with the effective ingredients of the present invention, a still further effect on overall quality improvement of fish pastes can be expected.

Among various formulations of the improving agent of the invention, improving agents containing sugar(s) and/or sugar alcohol(s) can for example be prepared according to the following methods:

(1) A method wherein an aqueous solution of sugar(s) and/or sugar alcohol(s) is concentrated nealy to an anhydrous state, a previously prepared mixture of the effective ingredients of the invention with powders of sugar(s) and/or sugar alcohol(s) is added to the concentrate and mixed therewith, and if necessary, the resulting mixture is subjected to steps such as crystallization and/or drying, etc. to give a powdery or granular preparation.

(2) A method wherein a mixture of the effective ingredients of the invention is dispersed in sugar(s) and/or sugar alcohol(s) melted with heating, the dispersion is either cooled as such or cooled while adding thereto or mixing therewith powdery sugar(s) and/or sugar alcohol(s), and the cooled mixture is subjected to a step such as pulverization or granulation to give a powdery or granular preparation.

Further, other preparation methods such as spray drying and spray granulation may also be adopted.

In practice of the invention, it is necessary that the amount of the effective ingredient mixture to be added is 0.01 to 3 weight part per 100 weight parts of filtrated meat.

The reason is that when the amount to be added exceeds 3 wt %, increase of improvement effect in the elasticity in accordance with increase of the used amount is not obtained, and on the other hand when the amount is below 0.01 wt %, improvement effect in the elasticity is insufficient.

Further, it is preferable to add the improver mixture of the invention together with a polymerized phosphate in order to maintain the pH constant which has a strong influence on protein denaturation.

Although when the ingredients of the improver mixture of the invention are respectively independently used, some extent of elasticity improvement effect is expected, yet use of the ingredients in mixing synergistically increases the effect of elasticity and enables a large effect only in a small amount thereof.

The relation between the amount of sugar(s) and/or sugar alcohol(s) and the amount of a mixture of the effective ingredients of the invention is determined based on necessary amount of the sugar(s) and/or sugar alcohol(s) to be added to the fish meat and an appropriate amount of the mixture of the ingredients effective for elasticity improvement.

In this case, it is suitable that the amount of the effective ingredient mixture of the invention is 0.3 to 180 weight parts per 100 weight parts of the sugar(s) and/or sugar alcohol(s) as solid.

Effect of the quality-improving agents of the invention is remarkable elasticity, especially increase of flexibility in comparison with the conventional agents, but the mechanism from which the effect arises has not yet been clarified. However, it seems that molecules of the improving agent have some desirable effects which lead to strengthening of elasticity through binding to the proteins and water, concentration of various ingredients, etc.

By using the quality-improving agents for addition to Frozen SURIMI of the invention, it is possible to prepare fish pastes having a remarkably enhanced flexibility, compared to the usual agents.

BEST MODE FOR CARRYING OUT THE INVENTION

Examples and comparative example are described below, but the present invention is not limited to these examples.

Further, % in the following examples and comparative example represents weight %. Further, porosity and oil absorbing capacity in these examples were measured as follows:

(1) Porosity =

$$\left(1 - \frac{\text{Apparent specific gravity of powder or granul}}{\text{True specific gravity of powder or granul}}\right)$$

(2) Oil absorbing capacity:

A liquid of corn oil and hexaglycerin penta oleate in a weight ratio of 4:1 is added to and mixed with 15 g of a powder or granule sample, after 5 minutes, the mixture is transferred in a centrifuge tube wherein a filter cloth is lay out (the centrifuge tube having a hole at the bottom) and centrifuged at 1300 G for 10 minutes, and weight of the cake remaining on the filter cloth is measured and oil absorbing capacity is calculated by the following equation:

$$\text{Oil absorbing capacity} = \frac{(\text{Cake weight}) - 15}{15} \times 100$$

EXAMPLE 1

1 kg of Sodium bicarbonate, 0.5 kg of calcium citrate tetrahydrate and 0.5 kg of calcium lactate pentahydrate (all of them are those for addition to foods) were mixed for 20 minites in a V-type mixer (VM-5 TYPE made by MIYOSHI SEISAKUSYO K. K.) to obtain about 2 kg of quality improver-1 of the invention.

Composition of this improver was as defined in the mixing ratio, namely 50 wt % of sodium bicarbonate, 25 wt % of calcium citrate tetrahydrate and 25 wt % of calcium lactate pentahydrate.

EXAMPLE 2

11.43 kg of an aqueous 70% sorbitol solution (SORBIT W-70 made by TOWA CHEMICAL INDUSTRY CO., LTD.) was concentrated with heating in a vacuum kneader to an almost anhydrous state, and then cooled to 60° C.

2 kg of Anhydrous crystalline sorbitol (SORBIT WP made by TOWA CHEMICAL INDUSTRY CO., LTD.) as seed crystal and 400 g of the quality improver of the invention as obtained in Example 1 were added therein, followed by kneading with cooling to obtain a crystalline solidified material.

This solidified material was pulverized and classified, and powder having a particle size of 16 to 175 mesh was gathered to obtain about 8 kg of quality improver-2 of the invention.

Composition of this improver was analyzed by high performance liquid chromatography (IONPACK KC-811 made by SHOWA DENKO K. K. was used) and atomic absorption analysis to obtain the following result:

| Sorbitol | 92.5% |
|---|---|
| Sodium bicarbonate | 3.6% |
| Calcium citrate (as tetrahydrate) | 2.0% |
| Calcium lactate (as pentahydrate) | 1.9% |

EXAMPLE 3

38.57 kg of an aqueous 70% maltitol (AMALTY SYRUP made by TOWA CHEMICAL INDUSTRY CO., LTD.) was concentrated to a water content of 10%, 3.0 kg of powdery maltitol (AMALTY made by TOWA CHEMICAL INDUSTRY CO., LTD.) as seed crystal was added thereto and mixed therewith, and the mixture was cooled and solidified from 90° C. to ordinary temperature over a period of about 20 hours.

Water content of the solidified material was 9.1%.

The solidified material was roughly crushed, dried at 70° C. under reduced pressure and recrushed to obtain about 20 kg of porous maltitol powder having a particle size of 16 to 50 mesh.

This porous maltitol had an oil absorbing capacity of 15.8%, a porosity of 0.65 and an apparent specific gravity of 0.58.

4 kg of this porous maltitol powder was introduced into a floating fluid type dryer to form a fluid bed and dried with hot air having a temperature of 60° to 65° C. During the drying, a slurry previously prepared by dispersing 0.3 kg of a polymerized phosphate (MASCOLIN F26 made by TAIYO CHEMICAL INDUSTRY CO., LTD.) in 1 liter of water was sprayed therein and dried to obtain porous powder fixing the polymerized phosphate thereon.

While this porous powder was subjected to stirring and mixing, 0.4 kg of an oily substance mixture (a mixture of corn oil:hexaglycerin pentaoleate:sorbitan monooleate of 2:1:1 in weight ratio) was added dropwise thereto for impregnation. Further, 5.2 kg of the quality improver of the invention as obtained in Example 2 was added and uniformly mixed to obtain quality improver-3 of the invention.

This improver was subjected to composition analysis in the same manner as in Example 2, i.e., by high performance liquid chromatography and atomic absorption analysis to obtain the following result:

| Sorbitol | 50.4% |
|---|---|
| Maltitol | 40.5% |
| Oily substance | 4.0% |
| Polymerized phosphate | 3.1% |
| Sodium bicarbonate | 1.0% |
| Calcium citrate (as tetrahydrate) | 0.5% |
| Calcium lactate (as pentahydrate) | 0.5% |

Comparative Test 100 kg of filtrated meat obtained in a conventional manner from fresh walleye pollacks was divided into 10 sections of each 10 kg. To the 1st section (Sec. No. 1) were added 0.6 wt % of the improver obtained in Example 1 (corresponding to 0.3% of sodium bicarbonate, 0.15% of calcium citrate tetrahydrate and 0.15% of calcium lactate pentahydrate), 5% of sorbitol, 4% of sucrose and 0.3% of phosphate, respectively.

To the 2nd section (Sec. No. 2) were added 5.2% of the quality improver obtained in Example 2 (corresponding to 5% of sorbitol, 0.1% of sodium bicarbonate, 0.05% of calcium citrate tetrahydrate and 0.05% of calcium lactate pentahydrate), 4% of sucrose and 0.3% of polymerized phosphate, respectively.

To the 3rd section (Sec. No. 3) were added 5.2% of the quality improver obtained in Example 2, 4% of maltitol and 0.3% of polymerized phosphate, respectively.

To the 4th section (Sec. No. 4) was added 9.9% of the quality improver obtained in Example 3 (corresponding to 5% of sorbitol; 4% of porous maltitol, 0.1% of sodium bicarbonate, 0.05% of calcium citrate tetrahydrate, 0.05% of calcium lactate pentahydrate, 0.3% of polymerized phosphate and 0.4% of the oily substance).

To the 5th to 10th sections (Sec. No. 5 to Sec. No. 10) as comparative examples additives shown in Table 1 were added, respectively.

TABLE 1

| | Experiment Section | Kinds and quantity of additives in each experiment section | | | | | | | |
|---|---|---|---|---|---|---|---|---|---|
| | | Sorbitol | Maltitol | Sucrose | Sodium Bicarbonate | Calcium Citrate Tetrahydrate | Calcium Lactate Pentahydrate | Polymerized Phosphate *1 | Oily Substance |
| Present Invention | Sec. No. 1 | 5 | — | 4 | (0.3) | (0.15) | (0.15) | 0.3 | — |
| | Sec. No. 2 | (5) | — | 4 | (0.1) | (0.05) | (0.05) | 0.3 | — |
| | Sec. No. 3 | (5) | 4 | — | (0.1) | (0.05) | (0.05) | 0.3 | — |
| | Sec. No. 4 | (5) | (4) | — | (0.1) | (0.05) | (0.05) | (0.3) | (0.4) |
| Control | Sec. No. 5 | 5 | — | 4 | 0.2 | — | — | 0.3 | — |
| | Sec. No. 6 | 5 | — | 4 | — | 0.2 | — | 0.3 | — |
| | Sec. No. 7 | 5 | — | 4 | — | — | 0.2 | 0.3 | — |
| | Sec. No. 8 | 5 | — | 4 | 0.2 | — | 0.2 | 0.3 | — |
| | Sec. No. 9 | 5 | — | 4 | — | 0.2 | 0.2 | 0.3 | — |
| | Sec. No. 10 | 5 | — | 4 | — | — | — | 0.3 | — |

*1 Mixture of Sodium Pyrophosphate and Sodium Tripolyphosphate

After the addition, the sample of each section was ground down, immediately subjected to rapid freezing and preserved at −25° C.

TABLE 2

| | | Water and Hunter Whiteness of SURIMI | | | |
|---|---|---|---|---|---|
| | | 1 month preservation | | 3 months preservation | |
| | | Water (%) | Hunter's Whiteness | Water (%) | Hunter's Whiteness |
| Present Invention | Sec. No. 1 | 76.2 | 26.0 | 76.1 | 25.1 |
| | Sec. No. 2 | 76.1 | 25.9 | 76.2 | 25.8 |
| | Sec. No. 3 | 75.9 | 26.3 | 75.7 | 26.1 |
| | Sec. No. 4 | 75.9 | 29.9 | 75.8 | 29.8 |
| Control | Sec. No. 5 | 76.3 | 26.1 | 76.0 | 26.0 |
| | Sec. No. 6 | 76.1 | 25.9 | 76.0 | 25.7 |
| | Sec. No. 7 | 76.3 | 25.8 | 76.1 | 25.7 |
| | Sec. No. 8 | 76.2 | 26.3 | 75.9 | 26.1 |
| | Sec. No. 9 | 76.3 | 26.4 | 76.1 | 26.0 |
| | Sec. No. 10 | 76.5 | 25.7 | 76.3 | 25.6 |

TABLE 3

| | | Elasticity and Hunter Whiteness of KAMABOKO | | | | | | |
|---|---|---|---|---|---|---|---|---|
| | | 1 month preservation | | | | 3 months preservation | | |
| | | Elasticity | | | Hunter's Whiteness | Elasticity | | | Hunter's Whiteness |
| | | W (g) | L (g) | J s | | W (g) | L (g) | J s | |
| Present Invention | Sec. No. 1 | 335 | 1.37 | 466 | 42.7 | 330 | 1.37 | 452 | 42.5 |
| | Sec. No. 2 | 321 | 1.38 | 443 | 42.9 | 319 | 1.36 | 434 | 42.8 |
| | Sec. No. 3 | 319 | 1.38 | 440 | 43.1 | 319 | 1.38 | 440 | 42.6 |
| | Sec. No. 4 | 321 | 1.39 | 446 | 45.2 | 317 | 1.39 | 441 | 45.0 |
| Control | Sec. No. 5 | 270 | 1.15 | 311 | 42.1 | 265 | 1.14 | 302 | 41.7 |
| | Sec. No. 6 | 272 | 1.16 | 316 | 42.6 | 266 | 1.16 | 309 | 42.4 |
| | Sec. No. 7 | 245 | 1.27 | 311 | 42.4 | 245 | 1.25 | 306 | 42.0 |
| | Sec. No. 8 | 269 | 1.27 | 341 | 42.3 | 260 | 1.26 | 328 | 41.9 |
| | Sec. No. 9 | 271 | 1.28 | 347 | 42.4 | 268 | 1.26 | 338 | 42.0 |
| | Sec. No. 10 | 249 | 1.17 | 291 | 42.5 | 245 | 1.16 | 284 | 42.0 |

One month and three months after the preservation, 3 kg of sample of each section was subjected to quality comparison tests.

Hunter's whiteness of the SURIMI was shown in Table 2, and further, Hunter's whiteness and elasticity of KAMABOKO prepared using the SURIMI were shown in Table 3.

The KAMABOKO was prepared by grinding SURIMI as such, which had been thawed out by holding overnight at 5° C., for 5 minutes using a silent cutter (SUPER AP-12AW made by BIBUN MACHINE CONSTRUCTION CO., LTD.), grinding down with addition of 3% of sodium chloride for 15 minutes, packing the thus obtained meat paste into a vinylidene chloride casing film, and heating the resulting material at 90° C. for 40 minutes.

Measurement of Hunter's whiteness of SURIMI and KAMABOKO was carried out using ND-1001DP made by NIPPON DENSHOKU KOGYO CO., LTD., and measurement of elasticity of KAMABOKO was carried out using NRM-2002J (5 mm spherical plunger was used) made by FUDO KOGYO CO., LTD.

We claim:

1. A frozen surimi product which comprises frozen surimi and, as an effective ingredient, a mixture consisting essentially of sodium bicarbonate, calcium citrate and calcium lactate.

2. A frozen surimi product as claimed in claim 1, wherein said mixture is used in an amount ranging from 0.01 to 3 weight % based on the frozen surimi.

3. The frozen surimi product as claimed in claim 2, wherein said amount ranges from 0.05 to 0.5 weight %.

4. The frozen surimi product as defined in claim 2 wherein said product contains from 3 to 20 weight parts of sugar(s) and/or sugar alcohol(s).

5. The frozen surimi product as defined in claim 4 wherein said sugar(s) and sugar alcohol(s) are selected from the group consisting of sucrose, glucose, maltose, fructose, lactose, sorbitol, mannitol, xylitol, maltitol, lactitol and mixtures thereof.

6. A frozen surimi product as claimed in claim 1, wherein said mixture has a composition of 100 weight parts of sugar(s) and/or sugar alcohol(s), 0.1 to 60 weight parts of sodium bicarbonate, 0.1 to 60 weight parts of calcium citrate and 0.1 to 60 weight parts of calcium lactate.

7. The frozen surimi product as claimed in claim 6, wherein said sugar(s) and sugar alcohol(s) are selected from the group consisting of sucrose, glucose, maltose, fructose, lactose, sorbitol, mannitol, xylitol, maltitol lactitol and mixtures thereof.

8. The frozen surimi product as claimed in claim 1, wherein the ratio of calcium citrate to calcium lactate is 0.1-10 weight parts:1 weight part.

9. The frozen surimi product as claimed in claim 1, wherein said effective ingredient contains a mixture of sodium pyrophosphate and sodium tripolyphosphate.

10. The frozen surimi product as claimed in claim 9 wherein said mixture of sodium pyrophosphate and sodium tripolyphosphate is present in an amount of about 0.1 to 1 part by weight per 100 parts by weight of frozen surimi.

11. A process for preparing frozen surimi which comprises adding to surimi, as an effective ingredient, a mixture consisting essentially of sodium bicarbonate, calcium citrate and calcium lactate in an amount ranging from 0.01 to 3 weight % based on said surimi, and then freezing the surimi.

12. The process for preparing frozen surimi as claimed in claim 11 wherein said effective ingredient mixture contains a mixture of sodium pyrophosphate and sodium tripolyphosphate in an amount of about 0.1 to 1 part by weight per 100 parts by weight of said frozen surimi.

13. The process for preparing frozen surimi as claimed in claim 11 wherein said mixture contains 100 weight parts of sugar(s) and/or sugar alcohol(s) selected from the group consisting of sucrose, glucose, maltose, fructose, lactose, sorbitol, mannitol, xylitol, maltitol, lactitol and mixtures thereof.

14. The process for preparing frozen surimi as claimed in claim 11 wherein said mixture added to said surimi is in powder or granular form and has a particle size within the range of from 16 to 175 mesh.

* * * * *